Feb. 11, 1947.   M. MALLORY   2,415,505
DEVICE FOR THROTTLING INTERNAL-COMBUSTION ENGINES
Filed Oct. 19, 1944
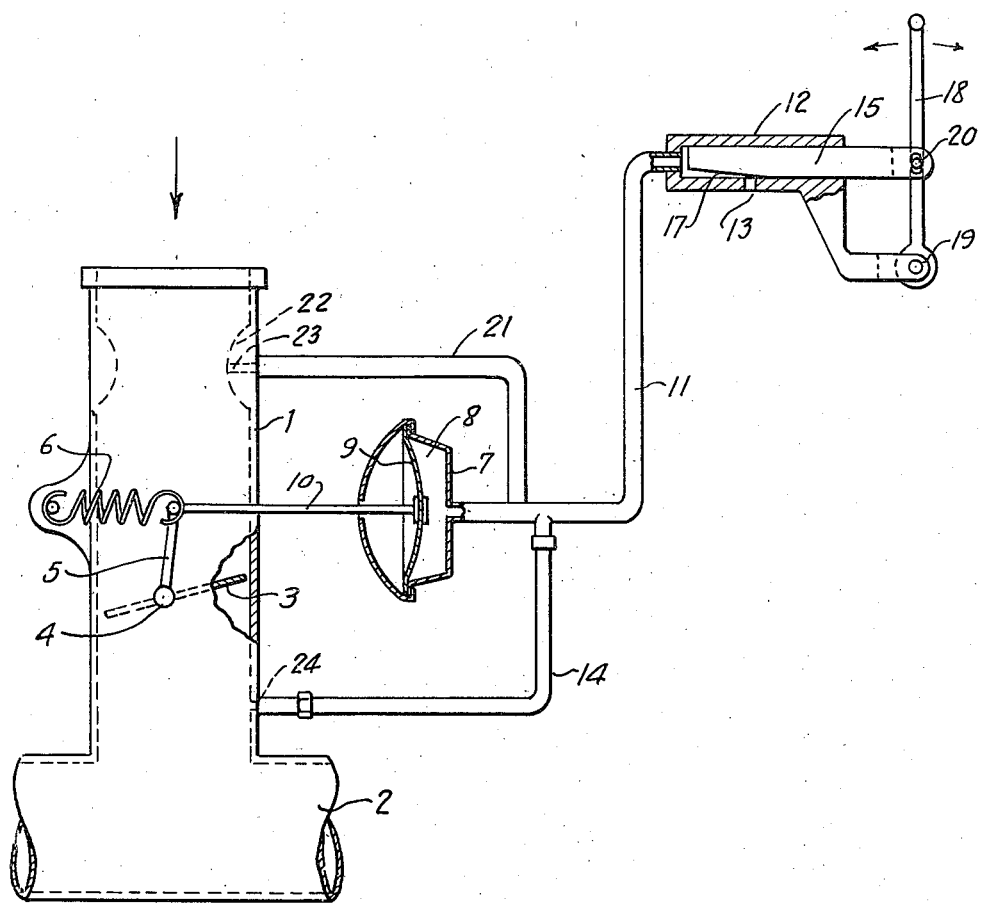
INVENTOR.
Marion Mallory
BY
Barnes, Kisselle, Laughlin & Frisch
Attorneys Patented Feb. 11, 1947

2,415,505

UNITED STATES PATENT OFFICE 2,415,505

DEVICE FOR THROTTLING INTERNAL-COMBUSTION ENGINES

Marion Mallory, Detroit, Mich.

Application October 19, 1944, Serial No. 559,421

3 Claims. (Cl. 123—103)

This invention relates to a device for throttling an internal combustion engine, and more particularly to a remotely controlled throttling device for an internal combustion engine. The invention also contemplates a throttling device for an internal combustion engine which is both manually and automatically controlled to effect an even and steady engine speed. Where the internal combustion engine is used for driving a vehicle, my throttling device produces very even, steady driving of the vehicle. My device in effect is a throttle governor.

In many automotive vehicles the operator is located a great distance from the engine, for example, the pilot of a multi-engine airplane and the operator of a bus having a rear engine drive. Where the operator is located a substantial distance from the engine in an automotive vehicle, it has been the practice to connect the accelerator pedal or the engine throttle lever with the throttle valve of the engine by links, rods or cables, or by complex and expensive hydraulically controlled apparatus.

It is the object of this invention to produce a device for remote throttling of an internal combustion engine which is simple, inexpensive, and efficient in operation.

The figure shows my device for remote throttling of an engine.

In the drawing the various elements are designated as follows: Intake passageway 1 for the motive fluid, engine intake manifold 2, butterfly throttle valve 3, valve shaft 4, valve crank arm 5, tension spring 6 tending to open throttle valve 4, suction device 7 having a suction chamber 8, flexible diaphragm 9, rod 10 connecting diaphragm 9 with crank arm 5, conduit 11 communicating at one end with suction device 7 and at the other end with atmosphere through valve housing 12 and outlet 13, conduit 14 connecting conduit 11 with the intake passageway 1 on the engine side of throttle 3, slide valve 15 in housing 12, tapered face 17 on valve 15, lever arm 18 pivoted on pin 19 and connected to valve 15 by a pin and slot connection 20, conduit 21 connecting suction device 7 into a venturi 22 on the atmosphere side of valve 3. Valve 3 is unbalanced so that the intake manifold suction tends to close the same.

The operation of my remote throttling device is as follows: As shown, valve 15 has closed air bleed orifice 13 so that the intake manifold suction or vacuum is imposed through conduit 14 upon diaphragm 9 thereby acting through rod 10 and arm 5 to close throttle 3 to engine idling position. When valve 3 is in idling position the full intake manifold suction is not imposed upon diaphragm 9 because orifice 23 is subjected to atmospheric pressure and acts as an air bleed to the suction device and to orifice 24. As throttle 3 moves toward open position, orifice 23 ceases to be an air bleed and actually becomes a suction orifice. To accelerate the engine speed, lever 18 is moved to the right thereby causing metering pin or valve 15 to gradually open air bleed orifice 13 and bleed down the vacuum or suction in suction device 8 thereby permitting spring 6 to correspondingly open vave 3. The tapered face 17 of metering pin 15 cooperates with air bleed orifice 13 to gradually open the same as valve 15 is moved to the right and to gradually close the same as metering valve 15 is moved to the left. As the effective area or size of air bleed 13 is gradually increased by moving metering valve 15 to the right, the pressure in suction chamber 8 will rise and thereby permit spring 6 to gradcally open throttle valve 3. When orifice 13 is completely open, throttle valve 3 will be wide open. To throttle the engine down from wide open position, metering valve 15 is moved toward the left thereby causing taper 17 to gradually decrease the effective size of orifice 13, that is, gradually cut out the atmospheric air bleeding of suction device 8 which causes a pressure fall or vacuum increase in suction chamber 8. Since there is atmospheric pressure on the left hand or outside of diaphragm 9, as the pressure falls in chamber 8 the differential in pressure will cause diaphragm 9 to move toward the right overcoming the pull of spring 6 and moving throttle valve 3 to closed position.

If the engine were running at low speed with throttle valve 3 wide open, when air bleed 13 is shut off by metering pin 15, the suction at orifice 23, caused by the velocity of the air flowing through venturi 22, will act upon diaphragm 19 to start valve 3 toward closed position. If desired, valve 3 can be unbalanced like a velocity governor throttle valve so that the intake manifold suction will tend to close valve 3. As valve 3 moves toward closed position the vacuum or suction at orifice 24 increases and this vacuum, as blended down by the air bleed orifice 23, will be established in suction chamber 8 thereby bringing throttle valve 3 to idle position.

This device is especially valuable for both automatically and manually controlling the speed of an automotive vehicle so that it is steady and even. If the driver moves the throttle lever 18 toward the right so that metering pin 15 opens air bleed 13, say, half way, to accelerate the vehicle from slow speed, he would obtain good acceleration but his engine would tend to overspeed because the throttle would be all the way open when accelerating from low speed with a small amount of air bleeding at orifice 13. However, the increased speed of the engine would increase the suction at both orifices 23 and 24 causing the throttle to move somewhat toward closed position and prevent excessive high speed. In other words, my throttling device would act as a governor which is controlled automatically by the intake passageway pressures as well as by the manual air bleed control 13, 15. The speed at which the engine would be governed would, of course, depend upon the strength of spring 6, the extent of the unbalancing of valve 3, the size of the diaphragm 9, and other known variables.

If the metering pin 15 were locked in one position and the motor vehicle came to a hill, the engine would slow down due to the increased load and the vacuum would decrease in the intake passageway at orifices 23 and 24 and in suction chamber 8, thereby permitting spring 6 to open throttle 3 wider and thereby increase the charge flowing into the engine sufficiently to maintain the engine or vehicle speed. Now, if the vehicle started to roll down hill, the speed of the engine would tend to increase but this in turn would increase the suction established through orifices 23 and 24 in suction chamber 8 and cause valve 3 to move toward closed position to again maintain the desired speed of the engine. Thus, it will be seen that the automatic control of throttle valve 3 in accordance with the intake passageway pressures supplements or modifies the manual control of throttle valve 3 exercised through metering pin 15 and air bleed 13. When orifice 13 is wide open, substantially atmosphere pressure obtains in the suction device and throttle 3 is moved wide open by spring 6.

My device prevents racing or overspeeding of the engine or the vehicle driven by the engine and at the same time the driver can obtain all the power he desires from the engine until the engine or vehicle reaches some predetermined or desired governed speed.

I claim:

1. In an internal combustion engine having an intake passageway, a throttle valve in said passageway controlling the flow of motive fluid to said engine, means actuated through changes of pressure in said intake passageway for imparting movement to said valve to govern the speed of the engine, a venturi in said passageway on the atmosphere side of the throttle valve, a conduit connecting said pressure actuated means into said venturi, a second conduit connecting said pressure actuated means into the intake passageway on the engine side of said throttle valve, and an adjustable air bleed for said pressure actuated means adjustable for varying the pressure acting upon said pressure actuated means to influence the action of the same and to vary the governed speed of the engine whereby when the air bleed is set in one position of adjustment and the engine is running at its governed speed a decrease in the load on the engine will tend to increase the engine speed thereby increasing the velocity of the air flowing through the venturi which in turn establishes a lower pressure in the pressure actuated means to thereby move the throttle toward closed position and maintain the governed speed of the engine.

2. In an internal combustion engine having an intake passageway, an automatically actuated throttling governor device influenced manually to vary the governed speed of the engine comprising a throttle valve in said passageway controlling the flow of motive fluid to said engine, means actuated through changes of pressure in said intake passageway for imparting movement to said valve to govern the speed of the engine, a conduit connecting said pressure actuated means into the intake passageway on the engine side of the throttle valve, a venturi in the intake passageway on the atmosphere side of the throttle valve, and a second conduit connecting the pressure actuated means into said venturi, and manually controlled air bleed means for varying the pressure acting upon the said pressure actuated means to influence the action of the same and to vary the governed speed of the engine.

3. In an internal combustion engine having an intake passageway, an automatically actuated throttling governor device influenced manually to vary the governed speed of the engine comprising a throttle valve in said passageway controlling the flow of motive fluid to said engine, means actuated through changes of pressure in said intake passageway for imparting movement to said valve to govern the speed of the engine, an orifice in the intake passageway on the engine side of said throttle valve, a second orifice in the intake passageway on the atmosphere side of said throttle valve, conduits connecting said pressure actuated means with said first and second orifices whereby as the throttle valve moves toward closed position said second orifice acts as an air bleed to the first orifice and as said throttle valve moves toward open position said second orifice ceases to be an air bleed orifice and becomes a suction orifice, and manually controlled air bleed means for varying the pressure acting upon the said pressure actuated means to influence the action of the same and to vary the governed speed of the engine.

MARION MALLORY.

REFERENCES CITED

The following references are of record in the file of this patent:

UNITED STATES PATENTS

| Number | Name | Date |
|---|---|---|
| 2,065,909 | Rockwell | Dec. 29, 1936 |
| 2,356,679 | Mallory | Aug. 22, 1944 |